Jan. 14, 1958  E. S. KALJOT  2,820,080
STORAGE BATTERIES
Filed March 11, 1955

INVENTOR
ERICH SIEGFRIED KALJOT
BY
ATTORNEYS

United States Patent Office 2,820,080
Patented Jan. 14, 1958

2,820,080
STORAGE BATTERIES

Erich Siegfried Kaljot, Sundbyberg, Stockholm, Sweden

Application March 11, 1955, Serial No. 493,728

Claims priority, application Sweden March 18, 1954

2 Claims. (Cl. 136—81)

This invention relates to storage batteries and more particularly to certain new and useful improvements in storage batteries of the type comprising a battery case, cells formed between spaced parallel transversal walls in said case, an electrolyte contained in each such cell, and a plate assembly immersed in the electrolyte in each cell with its flat surfaces facing the respective one of two adjacent transversal walls.

In order, in a storage battery of the type specified, to maintain the plate assemblies in their correct operative position in use, and especially to space the two outermost plates of any plate assembly from the respective adjacent transversal cell wall, so as to prevent the plate assembly from touching the inner wall-surfaces of the battery case, when in operation, for instance installed in a motor car, it has been common practice to use as lateral spacing elements thin strips of wood disposed between the plate assemblies and the corresponding cell walls.

Such wooden spacers, however, only function satisfactorily for relatively short periods of use since wooden materials are not capable of withstanding the chemical and mechanical influence of acid and thus will rapidly break down structurally.

The present invention has for its primary object to eliminate the drawback referred to and to provide a spacing member involving, in addition, other useful and advantageous features as compared to the conventional wooden spacers as hithertofore employed. Examples of inventive objects and advantages are: inertness to chemical destruction by the electrolyte; a resilient or flexible clamping action; and minimum obstruction to the circulation of and accessibility by the electrolyte to the plate assemblies.

For the objects stated, according to the present invention, there are provided in a storage battery of the type specified hereinbefore: separate spacing members disposed between each flat surface of each one of said plate assemblies and the adjacent one of the two transversal cell-walls, each such spacing member consisting of a U-shaped clamp embracing said assembly with its legs extending substantially vertically and resiliently engaging both the respective one of the two outermost plates of the assembly and the adjacent transversal cell-wall, and the intervening portion of said U-shaped clamp extending across the top of said plate assembly and being supported thereon.

According to a preferred embodiment of the invention it is arranged that each leg of the U-shaped clamp is a strip of channel-section along a substantial portion, at least, of its length, in which case the depth of the channels thus formed is slightly larger than the clearance between the plate assembly and the adjacent transversal cell-wall.

According to a subsidiary feature of the invention the U-shaped clamp is a stripmolding with each one of its legs of channel-section along a substantial portion, at least, of its length, the depth of the channels thus formed being slightly larger than the clearance between the plate assembly and the adjacent transversal cell-wall, the intervening portion of said U-shaped clamp extending across the top of the plate assembly and being supported thereon, and both the spacing legs and the intervening portion of said clamp being perforated to enable the passage of electrolyte in circulation therethrough.

A preferred embodiment of the invention will now be described, by way of example only, reference being had to the accompanying drawing in which.

Figures 1, 2, 3:
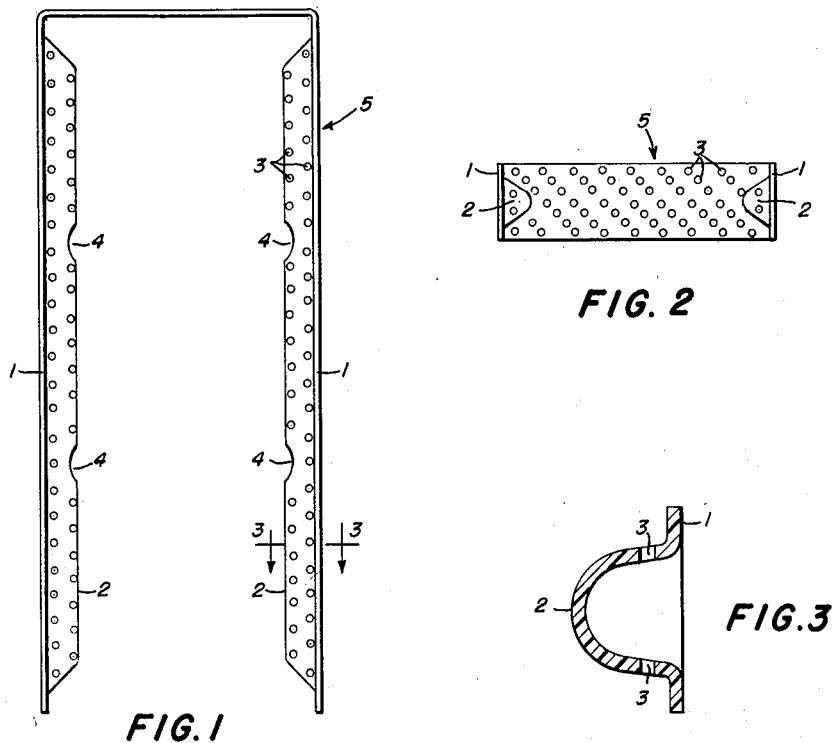
Fig. 1 is a plan elevational view of a clamp to be associated with a plate assembly of a storage battery.
Fig. 2 is a plan view of the clamp.
Fig. 3 is a cross-section through one leg of the clamp, as taken on the line A—A in Fig. 1.
Figure 4:
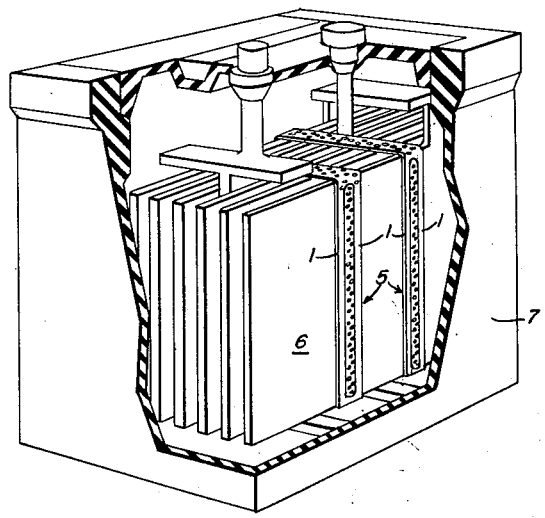
Fig. 4 is a perspective view of an end section of a storage battery incorporating two clamps of the type specified, the battery case being shown broken away to illustrate the internal arrangements.

Referring now to the drawings more specifically, numeral 5 generally denotes the clamp which is a U-shaped (or invertedly U-shaped) strip-molding made of any suitable plastic material. The two legs of this U-shaped strip-molding 1 are of channel-section, as will appear from Fig. 3, having their channels 2 extending along substantially the whole length of the legs, the summits of these channels facing each other and lying in the center plane of the clamp 5. The channels 2 are bordered by longitudinally extending flat flanges 1 (Figs. 1 to 3) adapted in the operative position (Fig. 4) to engage the corresponding transversal walls 7 of the battery case, whereas, in this position, the summits of the ridges formed by these channels resiliently engage the corresponding flat face of the outermost plate 6 in the plate assembly so as to space the plate 6 from the adjacent transversal wall 7 and thus maintain an adequate clearance therebetween accessible to the electrolyte. In order to ensure maximum accessibility for the electrolyte circulation, both the two legs and the intervening portion of the clamp are perforated with a multiplicity of small holes 3 and a number of larger apertures 4 which enable the electrolyte to pass through the clamps 5. In the representation of Fig. 4 the plate assembly illustrated is shown equipped with two spacing and retaining clamps in accordance with the present invention, the intervening portions of these clamps being supported on the top of the assembly.

In order to ensure maximum efficiency of the clamp, the channels of its legs should have a depth slightly larger than the width of the clearance between the plate 6 of the assembly and the adjacent transversal wall 7 which is allowed for by the resiliency of the material constituting the clamp, in combination with the channel-section per se.

Since the storage battery illustrated is of a well-known and conventional type, no specific description of its component parts is deemed to be necessary.

It is understood that the invention is not restricted to the preferred embodiment described hereinbefore and as illustrated in the accompanying drawing, since the same is susceptible of various modifications within the scope of the invention as defined in and by the appended claims.

I claim:

1. A storage battery comprising a battery case, a plate assembly in the case, a spacing member interposed between the walls of the case and the flat surface of the plate assembly, the spacing member being in the form of a U-shaped clamp embracing said plate assembly with its legs extending vertically and resiliently engaging at all times the walls of the case and the surface of the plate assembly and its intervening portion extending across the top of said plate assembly and being supported thereon, each leg of said U-shaped clamp being in the form of a channel section extending along its length, the summits of these channel sections facing each other and lying in the center vertical plane of the clamp, the depth of the channels being slightly greater than the clearance between the plate assembly and the adjacent transverse cell wall.

2. A storage battery comprising a battery case, a plate assembly in the case, a spacing member interposed between the walls of the case and the flat surface of the plate assembly, the spacing member being in the form of a U-shaped clamp embracing said plate assembly with its legs extending vertically and its intervening portion extending across the top of said plate assembly, each leg of said U-shaped clamp being provided with channels extending along substantially the whole length of the legs, the summits of these channels facing each other and lying in the center vertical plane of the clamp, the channels being bordered by longitudinally extending flat flanges adapted in the operative position to engage the corresponding transverse walls of the battery case, the summits of the ridges formed by the channels resiliently engaging the corresponding flat faces of the outermost plates in the plate assembly so as to space the outermost plates from the adjacent transverse wall and thereby maintain an adequate clearance therebetween accessible to the electrolyte.

References Cited in the file of this patent

UNITED STATES PATENTS

| 549,079 | Rooney | Oct. 29, 1895 |
| 1,340,636 | Sturges | May 18, 1920 |
| 2,727,079 | Chubb et al. | Dec. 13, 1955 |

FOREIGN PATENTS

| 1,024,053 | France | Mar. 27, 1953 |
| 1,048,023 | France | Dec. 18, 1953 |